March 1, 1955 R. BINDER 2,703,164
AUTOMATIC WEAR COMPENSATOR
Filed April 13, 1950 5 Sheets-Sheet 3
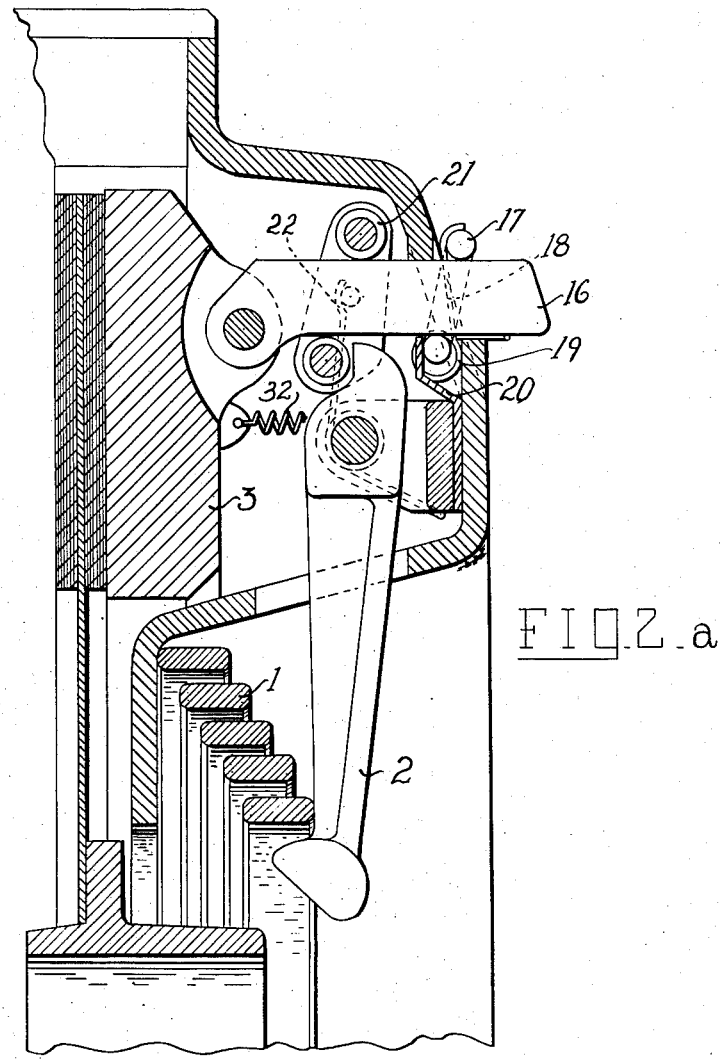
FIG.2.a
INVENTOR:
RICHARD BINDER
BY
Richardson, David and Nordon
ATTORNEYS

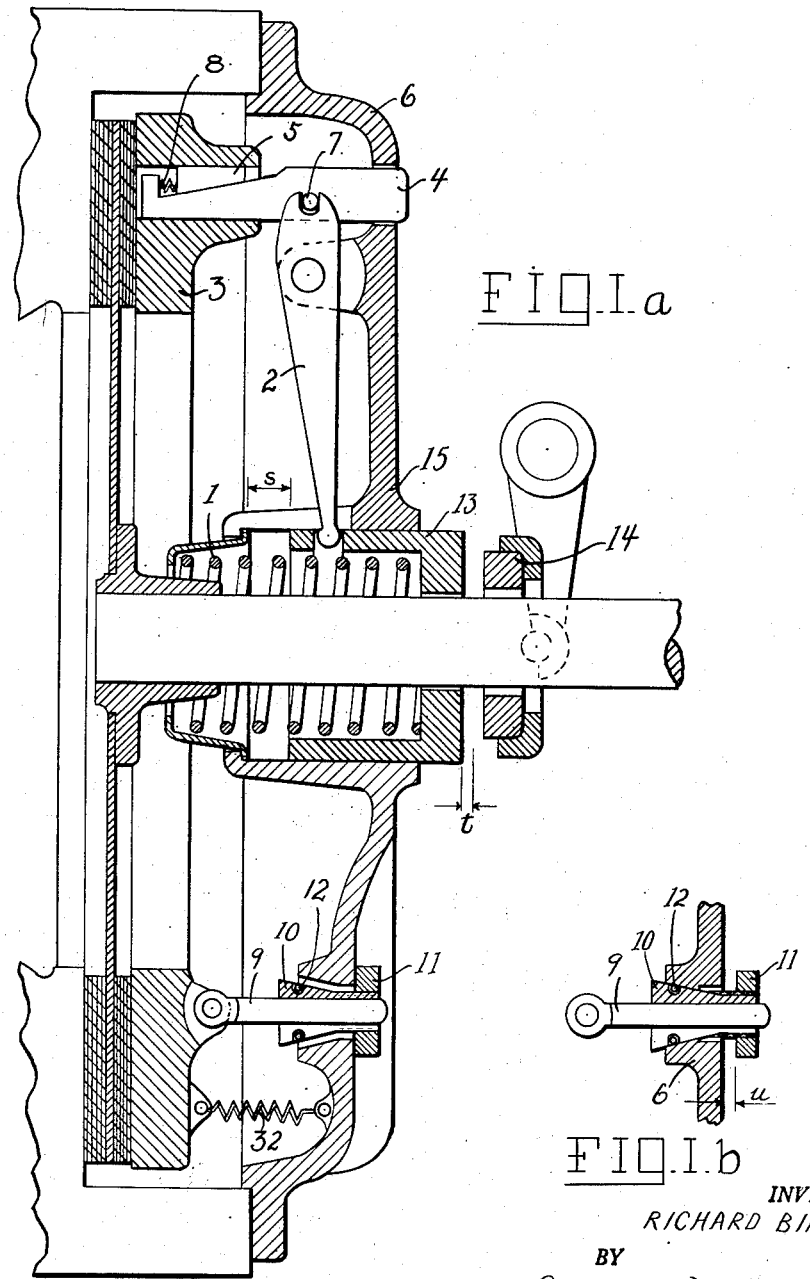

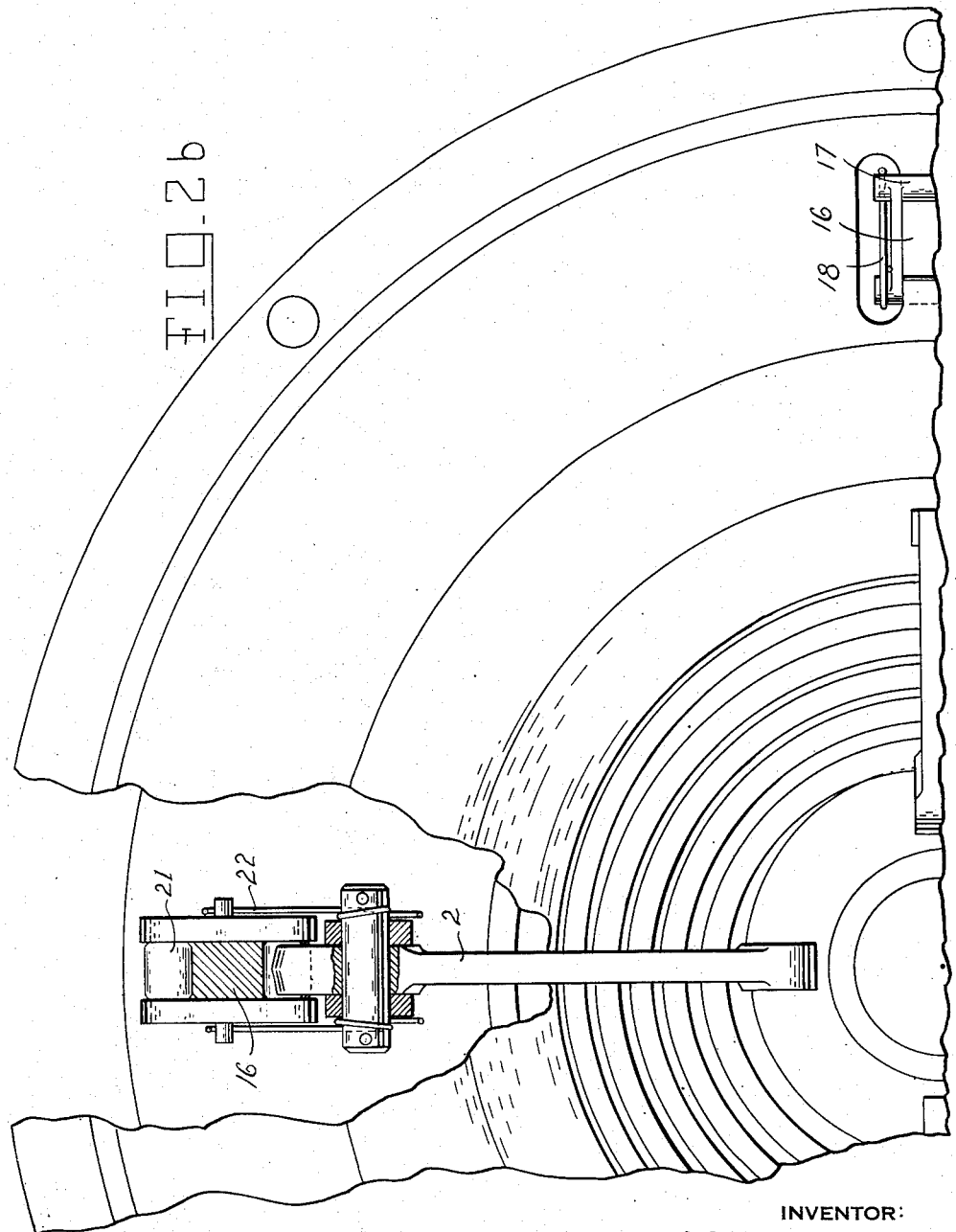

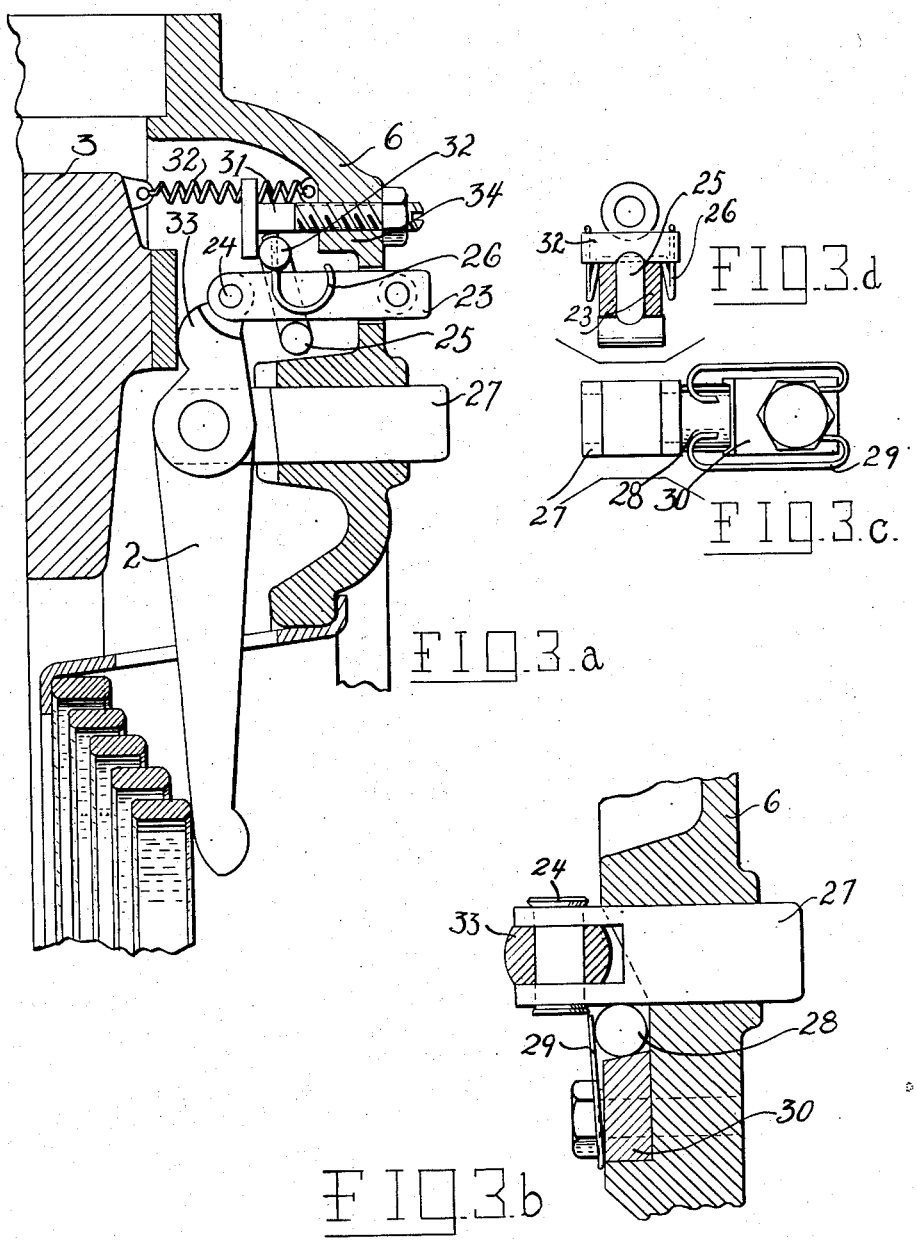

United States Patent Office 2,703,164
Patented Mar. 1, 1955

2,703,164

AUTOMATIC WEAR COMPENSATOR

Richard Binder, Schweinfurt, Germany

Application April 13, 1950, Serial No. 155,570

9 Claims. (Cl. 192—111)

The present invention relates to improvements in friction clutches or couplings.

Whilst the clutch or coupling of the present invention is generally applicable, it is particularly suitable for use in connection with automobile vehicles.

An object of the present invention is to provide a clutch or coupling which will automatically compensate itself for wear on the friction coupling surfaces, whilst maintaining constant the coupling pressure on the clutch plate or the like element obtained either by a number of springs spaced round its periphery or by a single central spring.

According to the present invention the maintenance of clutch engagement pressure at a constant value in the automatic readjustment of the operating lever system against the effects of wear is obtained by the provision of two locking elements, of which one is disposed between the operating levers and the clutch plate or the casing and provides a positive connection in the direction of application of pressure, whilst the second locking element is disposed between the clutch plate, or a part displaced with the clutch plate, and the casing, and arrests the rearward movement of the clutch plate when the clutch is uncoupled when this plate is moved over a predetermined distance. The amount of movement of the clutch plate is so chosen that when wear of the friction surfaces takes place, the movement of the clutch plate is arrested shortly before the end position of the withdrawal levers is reached, so that a first locking is effected by the amount of wear, and consequently a complete compensation for wear is obtained.

The invention is further described with reference to the accompanying drawings, in which:

Fig. 1a is a side sectional elevation through one form of clutch,

Fig. 1b is a detail in view of a part of the structure shown in Figure 1a,

Figure 1C:
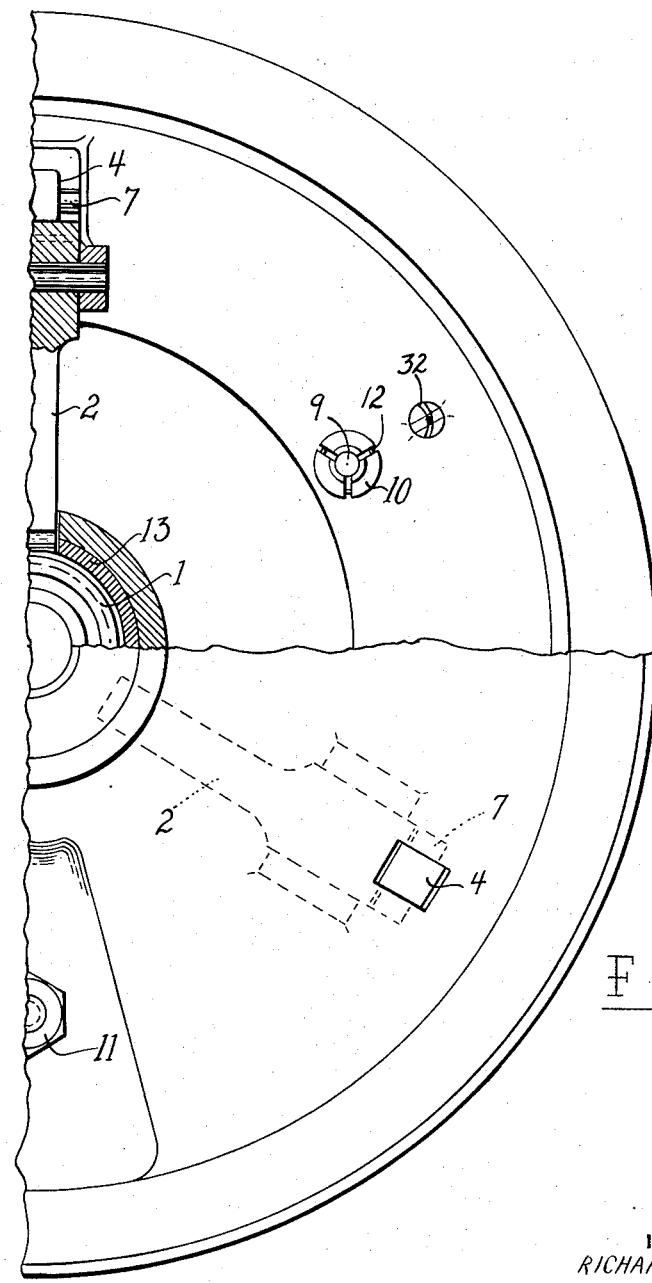

Fig. 1c is an external view of the clutch of Fig. 1a with the casing partly removed, Fig. 2a is a side sectional elevation through a second form of construction, Fig. 2b is a front view of the clutch of Fig. 2a with the casing partly broken away, Fig. 3a is a sectional elevation of a third form of construction of clutch, and Figs. 3b, 3c and 3d are detail views of part of the structure shown in Fig. 3a.

In the clutch shown in Figs. 1a, 1b and 1c, pressure from the central spring 1 is transmitted over the levers 2 to the clutch or thrust plate 3 through a locking device which consists of a bolt 4 and a wedge 5. This bolt 4 and the wedge 5 are displaceable in a slot in the clutch plate 3, the bolt reciprocating in an opening in the casing 6. The bolt 4 is connected with the outer forked end of the levers 2 by means of a pin 7 effective in both clutch engaged and clutch withdrawal directions. The wedge 5 co-operating with the inclined surfaces of the bolt 4 is under control of a pressure spring 8, which causes a wedging of the locking parts with the clutch plate 3 in the direction of clutch engagement. This locking is not effective in the opposite direction, so that the bolts 4 can slide out of the clutch plate 3.

The second locking device setting the degree of displacement of the clutch plate consists of a bolt 9 mounted either rigidly or pivotally upon the clutch plate 3 on which a conical sleeve 10 having a plurality of axial slots is frictionally mounted to be displaceable thereon, and in the uncoupled position engages with a conical socketed aperture in the casing 6. An adjustment of the degree of displacement can be effected by means of a nut 11 on the outer threaded end of the cone 10 which engages the front side of the casing 6. In order to obtain a desired frictional engagement between the cone 10 and the bolt 9, an annular spring 12 is disposed around the cone 10. Tension springs 32 are disposed in known manner between the clutch plate 3 and casing 6, which draw back the clutch plate 3 when the parts are to be uncoupled.

The operation of the device is as follows:

The desired amount of withdrawal $s$ of the clutch withdrawal sleeve 13 is obtained by adjusting the corresponding displacement $u$ of the clutch plate 3 (Figs. 1a and 1b) by means of the cone 10 lying against the casing 6 by adjusting the nut 11 against the casing 6. As long as there is no wear on the friction surfaces, the nut 11 will abut against the casing 6 in the coupled position of the parts shown in Fig. 1a. In the uncoupled position, that is to say at the end of the path $s$ as shown in Fig. 1a, the cone 10 engages the casing 6. Should now wear take place on the coupling parts, the spring 1 is tensioned, for instance by an amount $t$. Th bolt 9 will then be withdrawn from the cone 10 by the amount of wear. The play between the thrust block 14 and the thrust sleeve 13 will thereby be reduced by the amount $t$. At the next operation of the coupling (withdrawal of the clutch) the sleeve 13 will move over a distance equal to $s+t$. As after displacement through the distance $s$ the cone 10 engages the casing, it will follow that, due to the locking of the cone, a further displacement of the clutch plate in the direction of its withdrawal is prevented. During the remaining travel $t$ of the sleeve 13, in consequence, the bolt 4 will be withdrawn from the clutch plate 3 by an amount equal to the wear. When the clutch is again engaged, the original lever position, and with it the original spring tension, will be restored.

The adjustment of the coupling takes place wholly automatically. The clutch plate 3, prior to assembly, is pushed on to the bolts 4 as far as possible. After the clutch has been screwed up, the clutch levers 2 engage the casing 6 at the point 15. The amount of withdrawal displacement is then greater than $s$. After a number of operations of the clutch, the correct lever position will be automatically taken up, as above indicated.

In Figs. 2a and 2b, a modified form of locking mechanism is shown. In this form, the locking mechanism includes a coil spring 1 disposed outside the wall 19 of the casing 6 acting upon a lever 2 pivoted upon a bracket fixed to the casing. The lever extends through an opening in the casing to the outside thereof in the path of movement of the spring 1. An elongated bolt or plunger 16, rectangular in cross-section, is pivotally connected at one end to the pressure plate 3 and extends rearwardly through an opening in the casing to the outside of the casing.

Mounted on the bolt 16 adjacent the point therealong where it extends through the opening in the casing is a locking element in the form of a rectangular shaped saddle or collar 17, the bolt extending through the opening in the collar. The collar is slightly longer than the height of the bolt as viewed in Fig. 2a so that when the collar is slightly tilted at an angle to the vertical its upper and lower cross pieces will engage and bite into the upper and lower surfaces of the bolt. The upper cross piece of the collar is positioned outside the wall 19 of the casing and the lower cross piece is inside as shown in Fig. 2a, the lower cross piece abutting against the inside of wall 19. A torsion spring 18 having one end encircling the lower cross piece and its other end partially encircling the upper cross piece of the collar urges the upper cross piece outwardly and the lower cross piece inwardly into biting engagement with the bolt. The lower end of the collar is more or less fixed in position and restricted in its movement by the free end of an angle plate 20, fixed between the bracket and the wall 19 of the casing. The bolt 16 is permitted to move inwardly and axially in the coupling direction, but normal movement in the opposite or outward direction is prevented by the collar 17 which abuts against the wall 19 and bites into the top and bottom surfaces of the bolt.

Another locking element in the form of a rectangular-shaped saddle or collar 21 is similarly mounted on the bolt 16, the bolt extending through the opening in said locking element. The locking element 21 is substantially the same length as the locking element 17 so that when slightly tilted its upper cross piece and its lower cross piece bite into the upper and lower surfaces of the bolt. Element 21 is positioned inwardly of the element 17 inside the casing 6 with its lower cross piece adjacent to and in the path of movement of the short arm or nose of the lever 2. A torsion spring 22 encircles the pivot shaft of the lever 2 along each side of the collar 21 and has one end anchored to the fixed bracket on wall 19. Its other free end impinges against a stud extending laterally from the collar. These springs tend to urge the collar 21 outwardly along the bolt 16 with its lower cross piece in abutting relation with the short arm of the lever 2.

This form of mechanism operates as follows:

Should wear take place on the friction surfaces of the clutch parts, then when the clutch lever is released and the clutch spring 1 is expanded, the pressure plate 3 is moved a certain distance in the coupling direction including the distance caused by the wear. The bolt 16 is accordingly carried along with the plate an equal distance, the locking collar 17 permitting this because the collar pivots slightly around its lower cross piece permitting its upper cross piece to move inwardly slightly releasing its bite on the upper surface. The collar 17 will thus assume a new position along the bolt 16. With the next or withdrawal stroke of the thrust plate 3 and bolt 16, upon outward throw of the sleeve 13' by the pedal-actuated thrust block 14' along the clutch shaft, the bolt can move outwardly through the opening in the wall 19 a distance within the limits of its normal withdrawal, with the locking collar 17 in its new locking position ready to lock the bolt against outward movement other than normal movement until further wear occurs. Upon this withdrawal movement, the pressure plate 3 is disengaged from the friction surface with which it cooperates a distance corresponding to the normal clutch withdrawal distance. As, however, the clutch lever 2 can only be displaced by the normal degree of clutch withdrawal displacement, effected by the clutch pedal, the locking element 21 is moved outwardly along the bolt 16 to a new position therealong by means of the torsion spring 22 a distance equal to the amount of wear until its lower cross piece abuts against the short arm of the lever 2. If now the clutch pedal is again released, the pressure plate 3 presses against the cooperating clutch plate by reason of the action thereupon of the spring 1 transmitted through lever 2 and the locking element 21. The wear of the friction surfaces is compensated for by the displacement of the locking elements 21 on the bolts 16.

Another modified form of the invention is shown in Figs. 3a, 3b, 3c and 3d. The lever 2 in this form is pivoted to a guide bolt or plunger 27 which slides in an opening in the wall of the casing 6 but which is adapted to be locked in the pressure direction against displacement. This locking mechanism includes rollers 28 which engage and bind the bolt against movement. The rollers are interposed between wedge pieces 30, bolted to the inner surface of the casing 6 adjacent its opening, and the bolt 27. The rollers bind against the bolt 27 and prevent movement thereof and are held in this binding position by torsion spring 29 fastened to the wedge pieces with their free ends impinging against the rollers.

Projections 33 are formed on the short arm of the lever 2, which projections engage the pressure plate 3 for transmitting the pressure of the clutch spring through the lever to the plate. The clutch spring may be in the form shown in Fig. 2a or in any other suitable form known in the art.

A pair of elongated bolts or links 23, 23 are slidably mounted in an opening in the casing 6 with their inner ends pivotally connected to the upper end of the short arm of the lever 2 as viewed in Fig. 3a and with their outer end extending through the opening outwardly of the casing. The links are locked against movement by a locking element in the form of a double T-shaped member 25. The vertical connecting piece of this element is disposed between the links of the pair and when the element is slightly tilted from the vertical as shown in Fig. 3a its upper cross piece 32 engages and bites into the upper surfaces of the links 23 and its lower cross piece engages and bites into the lower surfaces of the links. A torsion spring 26 which is shaped to provide a cross piece and two spaced curved arms is positioned with its cross piece stradding the links and with the free ends of its curved arms anchored in the upper cross piece 32 for maintaining the locking element in tilted position with its upper cross piece tilted inwardly and its lower cross piece tilted outwardly in binding relation with the links.

A predetermined amount of movement of the pressure plate 3 is provided by a headed bolt 31 projecting through an opening in the casing 6 with its head positioned above the links 23 in the desired position therealong to engage the upper cross piece 32 of the locking element. A nut on the projecting outer end provides the necessary adjustment.

In normal operation, if the clutch pedal is released, the clutch spring operates upon the lower inner end of the lever 2 in a direction toward the right as viewed in Fig. 3a for moving the pressure plate 3 axially into frictional engagement with its cooperating clutch plate. In order to withdraw or disengage the pressure plate 3, the lever 2 is moved in the opposite direction, by movement of the sleeve 13" and pedal-actuated thrust block 14" thereby moving the links 23 outwardly through the opening in the casing a distance permitted by normal withdrawal operation.

If wear occurs, however, on the frictional engaging surfaces of the clutch parts, the pressure plate 3 will be moved axially in a clutchwise direction an additional distance equal in amount to the amount of such wear carrying the links 23, 23 therealong. The head of the bolt 31 however will prevent the locking element 25 from moving inwardly and will lift the upper cross piece 32 off of the links permitting the links to move inwardly the necessary distance to take up the wear whereupon the resistance of the head of the bolt ceases and the cross piece drops down into new biting position, the locking element thereby assuming a new locking position along the links.

If now the clutch pedal is again operated to withdraw the pressure plate 3, the lever 2 will move the links 23 outwardly through the opening in the casing until the cross piece 32 of the locking element 25 engages the part 34 of the casing which engagement will move the locking element 25 into a counterclockwise direction as viewed in Fig. 3a thereby forcing the upper cross piece 32 and the lower cross piece into biting engagement with the links and prevent further displacement outwardly of the links. Upon stoppage of the outer movement of the links, further movement of the lever 2 about its pivot takes place with the result that the guide bolt 27 is moved inwardly toward the clutching surfaces through the opening in the casing an additional distance corresponding to the amount of wear on the clutch frictional surfaces. Upon reengagement of the clutch parts, the rollers 28 prevent backward movement of the guide bolt 27 and the lever 2 will automatically assume the same position relative to the clutch spring and pressure plate 3 after the wear takes place as before, whether the clutch parts are coupled or uncoupled, and the relative positions of the operating parts also remain the same.

In this form of construction, the locking devices are all disposed inside the casing between the lever 2 and the casing wall so that the clutch pressure plate 3 can be assembled in a normal manner and presses against the lever 2 by means of springs.

I claim:

1. A clutch of the class described, comprising in combination: a rotatable and axially movable driving clutch plate, means defining an axially fixed backing surface connected for rotation with said movable clutch plate, a driven clutch plate engageably interposed between said movable clutch plate and said backing surface, cooperating friction surfaces on both of said clutch plates, spring means urging said clutch plates together, operating levers for transmitting the clutching action of the spring means to the plates, a first locking device adapted to provide a positive connection between the operating levers and the movable clutch plate for movement in the direction engaging the clutch and to break said positive connection when the movable clutch plate is moved in the declutching direction, and a second locking device adapted to halt the movable clutch plate after a predetermined separation of the clutch plates and to provide unlimited movement of the movable clutch plate for effecting clutching.

2. A clutch as set forth in claim 1 in which the first locking device includes a co-operating bolt and wedge housed in the movable clutch plate and connected by spring means.

3. A clutch as set forth in claim 2 in which the clutch plates are housed in a casing having an aperture and the second locking device comprises a rod movable with the movable clutch plate, a sleeve frictionally engaged on the rod, said rod and sleeve being movable through said aperture and a nut threadedly engaged on the end of the sleeve on the outside of the casing.

4. A clutch as set forth in claim 3 in which the rod is pivoted to the movable clutch plate.

5. A clutch as set forth in claim 3 in which the sleeve is of generally conical shape, and the aperture in the casing is complementarily conical.

6. A clutch as set forth in claim 1 in which the clutch plates are housed in a casing having a plurality of holes and in which the movable clutch plate has a number of bolts carried thereby, said bolts being longitudinally movable through the holes in the casing, each of said bolts carrying the first locking device and a second locking device, means causing said first device to bind on the bolt for clutching, and means causing the second locking device to bind on the bolt after a predetermined separation of the clutch plates.

7. A clutch as set forth in claim 6 in which the first and second locking devices comprise collars on said bolts, and torsion springs biasing said collars.

8. A clutch as set forth in claim 1 in which the clutch plates are housed in a casing having a plurality of holes and in which each operating lever is pivoted intermediate its ends to a guide bolt movable through a hole in the casing, said bolt being restrained by wedging means which permit it to approach the clutch plates but not to recede therefrom, said bolt and wedging means constituting a locking device each operating lever being pivoted at its outer end to a link movable through a separate hole in the casing, said link bearing another locking device, and a fixed abutment on the casing adapted to displace the last-named locking device along the link by a distance corresponding to the wear of the clutch plates, when wear takes place.

9. A clutch as set forth in claim 8 in which the last-named locking device comprises a collar on said link, the collar being biased by a torsion spring.

References Cited in the file of this patent

UNITED STATES PATENTS

| | | |
|---|---|---|
| 2,057,802 | Tatter | Oct. 20, 1936 |
| 2,057,803 | Tatter | Oct. 20, 1936 |
| 2,280,355 | Spase et al. | Apr. 21, 1942 |
| 2,392,956 | Thibeault | Jan. 15, 1946 |
| 2,526,149 | Myers et al. | Oct. 17, 1950 |